US008757658B2

(12) United States Patent
Feinstein

(10) Patent No.: US 8,757,658 B2
(45) Date of Patent: Jun. 24, 2014

(54) ADJUSTABLE GRIP STEERING WHEEL SAFETY SYSTEM TO PROTECT HANDS AND UPPER EXTREMITIES IN LOW IMPACT COLLISIONS

(75) Inventor: Peter A. Feinstein, Shavertown, PA (US)

(73) Assignee: Feinstein Patents LLC, Shavertown, PA (US)

( * ) Notice: Subject to any disclaimer, the term of this patent is extended or adjusted under 35 U.S.C. 154(b) by 0 days.

(21) Appl. No.: 13/594,316

(22) Filed: Aug. 24, 2012

(65) Prior Publication Data

US 2014/0054880 A1    Feb. 27, 2014

(51) Int. Cl.
*B60R 21/203*    (2006.01)
(52) U.S. Cl.
USPC ............................................ 280/731; 74/552
(58) Field of Classification Search
CPC .. B60R 21/203; B60R 21/2032; B60R 21/05; B60R 2021/0041; B62D 1/11; B62D 1/06; B62D 7/222
USPC ............................................ 280/731; 74/552
See application file for complete search history.

(56) References Cited

U.S. PATENT DOCUMENTS

| 5,174,599 | A | 12/1992 | Hull et al. |
| 5,207,713 | A | 5/1993 | Park |
| 6,220,630 | B1 | 4/2001 | Sundholm et al. |
| 6,382,661 | B1 * | 5/2002 | Sutherland ................. 280/728.2 |
| 6,648,367 | B2 | 11/2003 | Breed et al. |
| 6,893,044 | B2 | 5/2005 | Holmes et al. |
| 7,481,455 | B2 | 1/2009 | Iida et al. |
| 7,823,916 | B2 * | 11/2010 | Piotrowski .................... 280/731 |
| 2004/0212189 | A1 | 10/2004 | Kachu |
| 2010/0223760 | A1 | 9/2010 | Henke et al. |
| 2010/0282018 | A1 | 11/2010 | Bazinski |
| 2011/0246028 | A1 | 10/2011 | Lisseman et al. |

FOREIGN PATENT DOCUMENTS

JP    10-119700 A  *  5/1998

OTHER PUBLICATIONS

International Search Report and Written Opinion of the International Searching Authority Application No. PCT/US2013/052931 Completed: Nov. 25, 2013; Mailing Date: Dec. 5, 2013 11 pages.

* cited by examiner

*Primary Examiner* — Ruth Ilan
(74) *Attorney, Agent, or Firm* — St. Onge Steward Johnston & Reens LLC

(57) ABSTRACT

A safety system for protecting the fingers, hands, wrists, elbows, arms and shoulders of a driver includes a bladder disposed on or in a handgrip of a steering wheel of a vehicle, at least one inflation device in fluid communication with the bladder, and a controller adapted to detect a collision involving the vehicle and cause the inflation device to inflate the bladder with a fluid when the collision is detected.

30 Claims, 10 Drawing Sheets

ADJUSTABLE GRIP STEERING WHEEL SAFETY SYSTEM TO PROTECT HANDS AND UPPER EXTREMITIES IN LOW IMPACT COLLISIONS

FIELD OF THE INVENTION

This invention relates to vehicle occupant protection systems and more specifically to an adjustable grip steering wheel safety system for protecting the upper extremities of a driver during a vehicle collision.

BACKGROUND OF THE INVENTION

It is well known that vehicles are equipped with airbag systems and other inflatable systems to provide protection to a driver and passengers against injury during high-impact vehicle collisions. An airbag system for a steering wheel generally works by rapidly inflating a flexible bladder disposed within the steering wheel hub when the vehicle experiences a severe, high-impact collision. When the airbag system is deployed, the fully inflated bladder cushions and distributes load across the driver's head and chest and protects these body parts from hitting the vehicle interior, including the steering wheel, dashboard and car window. Conventional airbag systems comprise several sensors positioned at various locations in the car to detect a high-impact collision. If the sensors register the level of impact above a threshold, they immediately ignite a propellant to inflate the bladder. In the U.S., regulations require that airbags deploy in high-impact crashes at least equivalent in deceleration to a 23 km/h, or 14 mph, barrier collision (www.nhtsa.gov). A vehicle colliding with a stationary barrier at 14 mph generates approximately 7 G's of force. Collisions at a minimum speed of 30 mph as well as head-on collisions at 25 mph generate similar amount of force. Examples of conventional airbag systems for protection during high-impact collisions are disclosed in various patents, including U.S. Pat. Nos. 6,220,630, 6,648,367, 6,893,044 and 7,481,455.

Although conventional steering wheel airbag systems provide protection to a driver, such protection is limited to the driver's head and chest. The driver's fingers, hands, wrists, arms, elbows, and shoulders (herein "upper extremities") are usually left defenseless, and thus, are prone to injury during the vehicle collision. The vibrations and pressure of the impact are transferred through the steering wheel to the driver's upper extremities. This instantaneous transmission of large vibrations and high pressure can cause traumatic carpal tunnel syndrome (CTS), other upper-extremity neurological injuries, stress/sprain/strain-related injuries in the upper extremities, as well as fractures and dislocations in areas of the wrists, such as distal radius Colles' fracture, hand fractures and dislocations, such as metacarpal fractures (e.g., Bennett's fracture of the thumb), elbow fractures, and shoulder fractures. Any of the above medical conditions, injuries, and fractures/dislocations can also be aggravated if the driver's arms are outstretched and gripping the steering wheel in an extended wrist position when the vehicle collision occurs. Both low-impact and high-impact collisions can cause CTS, neurological injuries, and stress/sprain/strain-related injuries in the driver's upper extremities. Indeed, CTS and other upper extremity injuries are a major concern in low-impact collisions, whereas in high-impact collisions, full body traumatic injuries require the most attention.

In view of the above, conventional steering wheel airbag systems fail to provide any protection for the driver's upper extremities in a vehicle collision, especially in a low-impact collision (e.g., a collision comparable to hitting a solid barrier at less than 14 mph, general collisions at speeds less than 30 mph, head-on collisions at speeds less than 25 mph).

Some vehicle safety systems may provide for some form of protection to the driver's upper extremities. For example, U.S. Pat. No. 6,382,661 to Sutherland discloses a steering wheel apparatus adapted to protect a driver in a vehicle collision when the driver is not seated properly in the driver seat. The apparatus includes a steering wheel rim, or handgrip, having at least one inflatable bladder mounted thereon and an internal inflator which inflates the bladder by passing fluid through channels and fluid openings created in the rim. However, the apparatus does not cover the entire steering wheel rim. Only certain portions of the steering wheel are adapted with the bladder. As such, the apparatus is only effective if the driver is gripping a section of the steering wheel rim that has the bladder. Furthermore, the bladder is not specifically designed to provide protection to the driver's hands and arms or configured to inflate during a low-impact collision. In the event of a high-impact collision, the bladder helps to reposition an out-of-position driver (e.g., driver leaning forward in the car seat) as the standard steering wheel airbag begins to deploy. The safety system merely improves the effectiveness of the airbag system in protecting the driver's chest and head against injury. The apparatus also does not include a controller for adjusting the manner in which the bladder inflates based on the nature and characteristics of the collision.

U.S. Pat. No. 5,207,713 to Park discloses a safety cover attached onto a steering wheel handgrip which absorbs an impact between the driver's body and the steering wheel during a collision accident. The safety cover comprises an impact reducing section adapted to wrap around the entire circumferential surface of the steering wheel handgrip as well as a fixing section for mounting the impact reducing section to the handgrip. When the impact reducing section is filled with fluid, the cover exerts pressure against the steering wheel to assist in mounting the cover. Nevertheless, the cover may still rotatably move about the steering wheel handgrip while the driver is grasping the cover. This adversely affects the driver's ability to properly maneuver and maintain firm control over the steering wheel. During a collision, the impact force can also shift the cover about the steering wheel and thereby reduce its effectiveness. More importantly, the cover does not provide for "deployment" (i.e., rapid inflation of additional fluid) at the moment of collision. The cover also lacks a controller interfaced with an inflation device to adjust the amount of fluid contained within the impact reducing section. Therefore, the cover, which is preconfigured with a specific amount of fluid, may not sufficiently protect the driver's upper extremities against an impact with the steering wheel or absorb the vibrations transmitted to the driver's upper extremities during a collision.

While some steering wheel safety systems may provide improvements over conventional airbag systems, they still suffer from several disadvantages. One disadvantage is that current safety systems fail to provide sufficient protection to the upper extremities during a vehicle collision. Current safety systems also may not function during low-impact collisions, which can still cause CTS, neurological injuries, stress/sprain/strain injuries, and fractures/dislocations in the upper extremities. Another disadvantage is that the arrangement of the safety system may prevent the driver from being able to safely operate the steering wheel—and thus the vehicle—due to rotational movement of the safety system relative to the steering wheel. Further, safety systems do not incorporate a controller integrated with an inflation device to adjust the nature of deployment based on characteristics of the collision. Moreover, current safety systems fail to provide an adjustable grip for damping the typical vibrations transmitted through the steering wheel during normal driving operations. Standard airbag systems and steering wheel safety systems, therefore, fail to protect a driver's upper extremities during all stages of driving, including normal driving operations, low-impact collisions and high-impact collisions.

SUMMARY OF THE INVENTION

Accordingly, it is an object of the present invention to remedy the problems of conventional airbag systems which fail to protect a driver's fingers, hands, wrists, arms, elbows, and shoulders during vehicle collisions (e.g., low-impact collisions, high-impact collisions). The present invention provides a steering wheel safety system for protecting the driver's upper extremities against the vibrations and impact pressure transmitted thereto from the steering wheel in low-impact and/or high-impact collisions. Noted herein, the term "upper extremities" includes a person's fingers, hands, wrists, arms, elbows, and shoulders. The term "high-impact collision" herein refers to collisions comparable to hitting a solid barrier at or more than 14 mph, general collisions at speeds more than 30 mph, or head-on collisions at speeds more than 25 mph. Further, the term "low-impact collision" herein refers to collisions comparable to hitting a solid barrier less than 14 mph, general collisions at speeds less than 30 mph, or head-on collisions at speeds less than 25 mph.

It is another object of the present invention to provide a steering wheel safety system that can be adjusted automatically to provide sufficient cushion and protection to the driver's upper extremities based on characteristics of the collision (e.g., area of impact, direction of impact, force of impact, severity), and thus, reduce the likelihood of traumatic carpal tunnel syndrome and other stress/strain injuries.

It is a further object to provide a steering wheel safety system that provides an adjustable grip for damping the pressure and vibrations typically transmitted through the steering wheel during normal operation of the vehicle.

It is an additional object of the present invention to provide a steering wheel safety system that is adapted to be combined with the handgrip of a steering wheel and does not interfere or reduce a driver's ability to control and maneuver the steering wheel.

It is another object of the present invention to provide a steering wheel safety system that does not cause injuries to the driver's upper extremities and body when the system is deployed in a collision.

It is yet another object of the present invention to provide a steering wheel safety system that utilizes the existing equipment (e.g., crash sensors) of the vehicle's standard airbag system.

These and other objectives are achieved by providing an adjustable grip steering wheel safety system for protecting the upper extremities of a driver having a bladder disposed on or in a handgrip of a steering wheel, an inflation device in fluid communication with the bladder, and a controller adapted to detect a collision involving the vehicle, wherein the controller causes the inflation device to inflate the bladder with a fluid upon detecting the collision. The bladder, when inflated, cushions the upper extremities and absorbs the vibrations and impact pressure transmitted thereto during the collision. In some embodiments, the steering wheel safety system is adapted to deploy during low-impact collisions. In other embodiments, the steering wheel safety system is adapted to deploy during high-impact collisions. In further embodiments, the system is adapted to deploy during both low and high impact collisions.

Further objectives are achieved by providing an adjustable grip steering wheel safety system for protecting the upper extremities having a bladder releasably attached on an outer surface of a steering wheel handgrip, an inflation device in fluid communication with the bladder, and a controller which monitors the current condition and environment of the vehicle, is adapted to detect a vehicle collision based on the vehicle condition and environment, and initiates the inflation device to rapidly inflate the bladder with a fluid when the collision is detected.

Other objectives are achieved by providing a steering wheel safety system for protecting the upper extremities having a bladder releasably mounted inside a handgrip of the steering wheel, an inflation device in fluid communication with the bladder, and a controller which monitors the current condition and environment of the vehicle, is adapted to detect a vehicle collision based on the vehicle condition and environment, and initiates the inflation device to rapidly inflate the bladder with a fluid when the collision is detected. The handgrip is configured to have at least one aperture disposed in a section of the handgrip, wherein the aperture extends at least a portion of the circumference of the handgrip.

Further objectives of the present invention are achieved by providing an adjustable grip steering wheel safety system for protecting the upper extremities having at least one bladder disposed on or in a steering wheel handgrip, at least one inflation device in fluid communication with the bladder, at least one sensor disposed on the vehicle, the at least one sensor measuring at least one vehicle condition parameter, and a controller that is adapted to detect and determine the occurrence of a collision using said vehicle parameter. Examples of vehicle condition parameters are vehicle velocity, acceleration/deceleration, vehicle orientation, direction of motion, braking pressure, wheel rotational speed, area of impact and direction of impact. When a collision is detected, the controller causes the inflation device to rapidly inflate the bladder with a fluid. Using the at least one vehicle parameter, the controller can also determine the characteristics of the collision and adjust the volume of fluid and the inflation rate with which the inflation device expands the bladder. In some embodiments, the at least one sensor may include crash sensors of the vehicle's standard airbag system.

Where the steering wheel safety system has two or more inflation devices connected to the bladder, the controller determines an inflation rate for each inflation device to expand the bladder. In some embodiments, the inflation devices may have the same inflation rate and thus provide for the bladder to be uniformly inflated. In other embodiments, the inflation devices may each have a different inflation rate. This configuration may allow for certain sections of the bladder to be inflated more quickly than others. This can be beneficial where the bladder is adapted to provide protection localized and concentrated where the driver's hands are gripping the bladder/handgrip. Moreover, the controller can regulate the order in which the inflation devices are activated. In some instances, these devices simultaneously inflate the bladder. In other instances, the controller activates the inflation devices in a specified sequence. As an example, the inflation devices having fluid inlets into the bladder that are located at or near the position of the driver's hands can be activated first before other remaining inflation devices. This configuration further enables protection to be efficiently provided where the driver's hands are gripping the bladder/handgrip.

In some embodiments of the steering wheel safety system, there may be two or more bladders disposed on or in the handgrip. The controller controls the at least one inflation device to inflate each bladder at a specified inflation rate. More specifically, each bladder may have its own distinct inflation rate. Each bladder may also be inflated with a certain volume of fluid. The amount of fluid each inflatable bladder receives is determined by the controller based on collision characteristics and vehicle condition parameters.

Other objectives of the present invention are achieved by providing an adjustable grip steering wheel safety system for protecting the upper extremities, said system including a bladder disposed on or in a handgrip of the steering wheel, at least one inflation device in fluid communication with the bladder, and a controller, wherein the controller causes the inflation device to partially inflate the bladder with a volume of fluid for damping pressure and vibrations transmitted through the steering column and steering wheel to the upper extremities during normal driving operation of the vehicle, and further causes the inflation device to rapidly inflate the bladder with an additional volume of fluid for cushioning the driver's upper extremities when a collision is detected. By varying the partial inflation, the controller can continuously adjust the damping level of the bladder to provide sufficient attenuation of the vibrations based, at least in part, on their frequency and amplitude. The adjustable grip steering wheel safety system can further include a switch which provides for manual adjustment of the damping level of the bladder. Accordingly, the driver can modify damping levels to his or her preferences.

The adjustable grip steering wheel safety system can further be designed such that the bladder has one inflatable compartment or a plurality of inflatable compartments therein, each compartment being in fluid communication with the at least one inflation device. Where there are multiple compartments, each compartment may be fluidly connected, such that fluid in one compartment can flow to another. In other embodiments, each compartment may be isolated and have independent fluid communication with the at least one inflation device. Accordingly, each inflatable compartment can be inflated with a different volume of fluid in order to provide localized damping of certain sections of the steering wheel handgrip during normal driving operation. Further, the plurality of inflatable compartments may also provide for localized and concentrated protection to the upper extremities during a collision.

The adjustable grip steering wheel safety system according to the present invention is specifically adapted to cushion and protect the upper extremities of the driver, which standard airbag systems—typically stored in the hubs of steering wheels—fail to do. The safety system of the present invention also provides cushion and protection during low-impact collisions when conventional airbag systems fail to deploy. The safety system further dampens the vibrations and pressure typically transmitted through the steering wheel during normal driving operation of the vehicle.

Other features and aspects of the invention will become apparent from the following detailed description, taken in conjunction with the accompanying drawings, which illustrate by way of example, the features in accordance with embodiments of the invention. The summary is not intended to limit the scope of the invention, which is defined solely by the claims attached thereto.

DETAILED DESCRIPTION OF THE INVENTION

The following detailed description illustrates the invention by way of example, not by way of limitation of the principles of the invention.

As used herein, the terms "upper extremity" and "upper extremities" encompasses the fingers, hands, wrists, arms, elbows and shoulders of a person.

Figure 1:
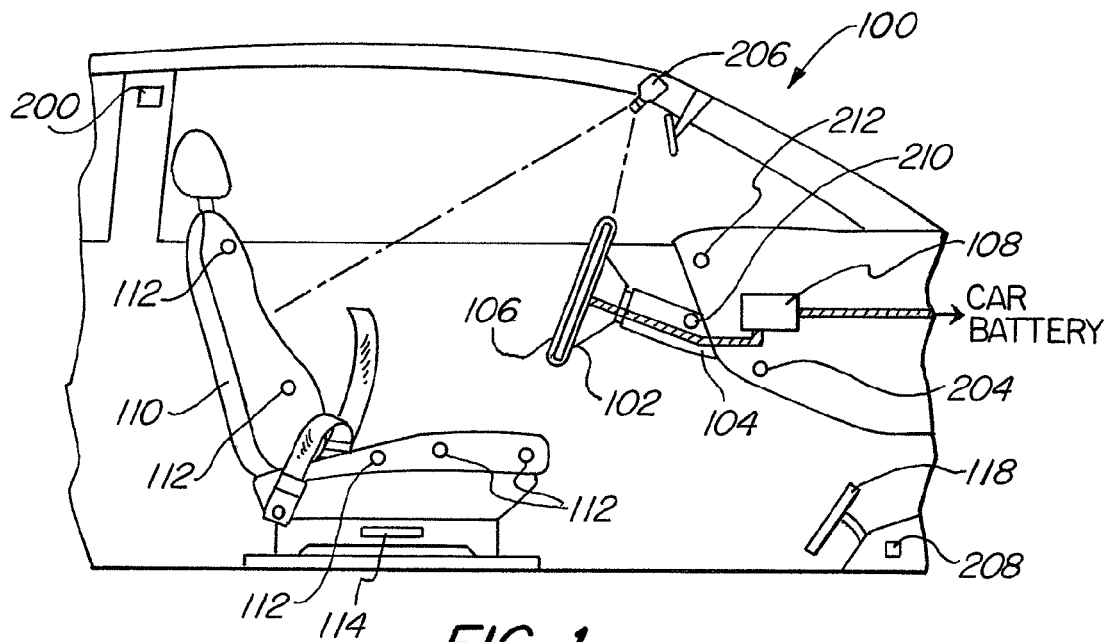
FIG. 1 is a schematic view of an adjustable grip steering wheel safety system according to an exemplary embodiment of the present invention in an undeployed (deflated) state.

Referring to the figures in detail and first to FIG. 1, there is shown an exemplary embodiment of an adjustable grip steering wheel safety system 100 for protecting the upper extremities of a driver in vehicle collisions, including low-impact collisions and/or high-impact collisions. The adjustable grip steering wheel safety system 100 (herein, "safety system") includes a bladder 106 disposed on or in a handgrip portion of a steering wheel 102, at least one inflation device 124 (shown in FIG. 3) in fluid communication with the bladder 106, and a controller 108 interfaced with the at least one inflation device 124 to manage the inflation process. In one embodiment, the bladder 106 is made of a flexible, elastic material. The bladder 106 can be formed from a flexible woven fabric material, such as polyamide, polyester or the like. Other materials may be used to make the bladder 106, including rubber, latex, polychloroprene, nylon fabric, synthetic fabric, silicone, synthetic resin, or any combination of these. The above list of materials is merely exemplary and as such, the bladder 106 can comprise of other materials not listed herein.

The bladder 106 is configured such that it can be inflated and deflated several times. The bladder 106 is adapted to withstand being rapidly inflated to its full capacity and subsequently deflated multiple times. This characteristic provides for the bladder 106 to be reusable after the safety system 100 has been deployed and also for general comfort of the grip. In other words, after being deployed during a collision, the bladder 106 can be deflated, arranged back into an initial configuration with respect to the handgrip 120 of steering wheel 102 (FIGS. 3 and 7), and redeployed in subsequent collisions. It is therefore not required that the bladder 106 be replaced after a first deployment, as is the case with standard airbags. The safety system 100 also does not damage any part of the steering wheel when the bladder 106 is deployed. As such, the degree of repair and maintenance the vehicle must undergo after a collision is minimized.

The bladder 106 may be adapted with a grip layer disposed on an outer surface of the bladder 106. The grip layer provides a slip-free surface for the hands of the driver to easily maneuver the steering wheel 102 while it is combined with the bladder 106. The grip layer further provides for a comfortable surface for the driver's hands as they grip the bladder 106. The grip layer can be formed from silicone, rubber, or like materials.

The design of the bladder 106 can comprise various internal compartment configurations. In some embodiments, the bladder 106 has one single inflatable compartment. In other embodiments, the bladder 106 has a plurality of inflatable compartments adapted to receive fluid from the inflation device 124. The multiple inflatable compartments provides for the bladder 106 to easily conform to any shape of the steering wheel handgrip 120. The inflatable compartments can be fluidly connected with each other. This allows movement of fluid between the inflatable compartments. Alternatively, the inflatable compartments can each be isolated and fluidly independent. Each compartment is adapted with an inlet which is in independent fluid communication with the inflation device 124. Given this arrangement, the steering wheel safety system 100 can provide an optimal form of protection to the driver's upper extremities. Specifically, depending on the type of collision (e.g., high-impact, low-impact) and the characteristics thereof (e.g., area of impact, direction of impact, force of impact, severity), the safety system 100 can customize the inflation of each individual compartment of the bladder 106 to provide sufficient protection to the upper extremities. Further, the inflatable compartments provide for protection to be localized or concentrated in particular sections of the bladder 106, and thereby affect how impact vibration and pressure is dampened relative to the hands gripping the bladder 106. For example, the bladder 106 with multiple inflatable compartments can be adapted to focus its expansion towards (or contraction away from) the palms of the hands. Conversely, the elastic bladder can be adapted to focus its expansion towards (or contraction away from) the fingers. In order to determine the position of the driver's hands, the bladder 106 may include a plurality of grip sensors detecting pressure that is exerted on the bladder 106. The chances that a collision causes traumatic carpal tunnel syndrome, neurological injuries, stress/sprain/strain-related injuries, and fractures/dislocations in the upper extremities are thus greatly reduced or eliminated with the above bladder configurations.

Figure 3:
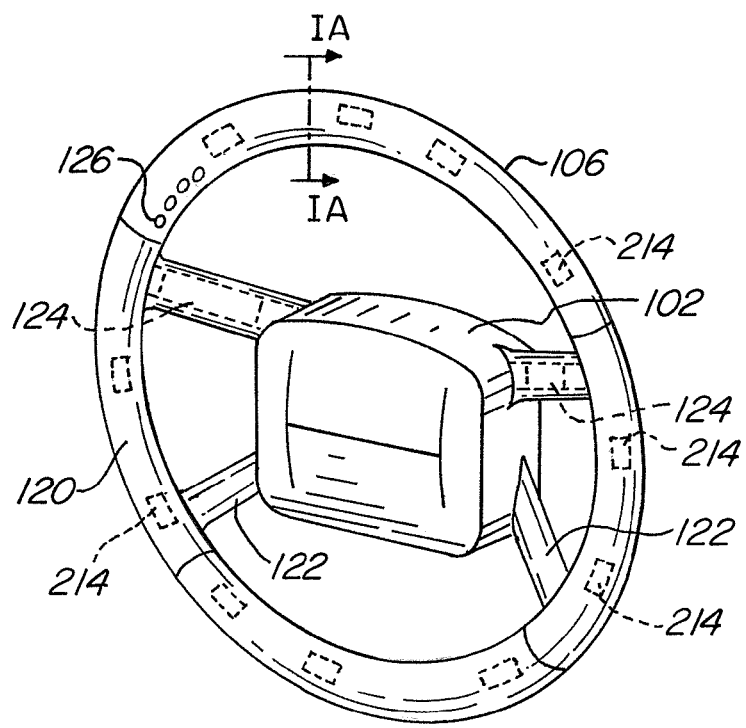
FIG. 3 is a perspective view of one embodiment of the bladder of the adjustable grip steering wheel safety system of FIG. 1, releasably mounted to the surface of a steering wheel handgrip, in an undeployed state.

Referring to FIGS. 3-6, there is shown one embodiment of the bladder 106. The bladder 106 is releasably attached to the outer surface of the handgrip 120 of the steering wheel 102, wherein the bladder 106 is adapted to cover at least a portion of the circumference of the handgrip 120. At times, the bladder 106 may cover the entire circumference of the handgrip 120, as shown FIG. 3. In some embodiments, the safety system 100 may comprise a plurality of bladders 106, each bladder being disposed on the handgrip 120 between a pair of neighboring spokes 122. For example, the safety system 100 may include two bladders 106, a first bladder disposed on the handgrip 120 between the two left spokes 122 and a second bladder disposed on the handgrip 120 between the two right spokes 122 (FIG. 3). Alternatively, the first bladder can be disposed between the two top spokes 122 while the second bladder is disposed between the two bottom spokes 122. The safety system 100, in another example, may comprise a number of bladders 106 equal to the number of spokes 122 of the steering wheel 102, wherein one bladder is disposed between each pair of neighboring spokes. The steering wheel 102 in FIG. 3, therefore, would be adapted with four bladders 106 covering a top, bottom, left, and right portions of the handgrip 120 defined between the spokes 122. As a result, the bladders 106 would substantially cover the entire circumference of the handgrip 120.

Figure 4:
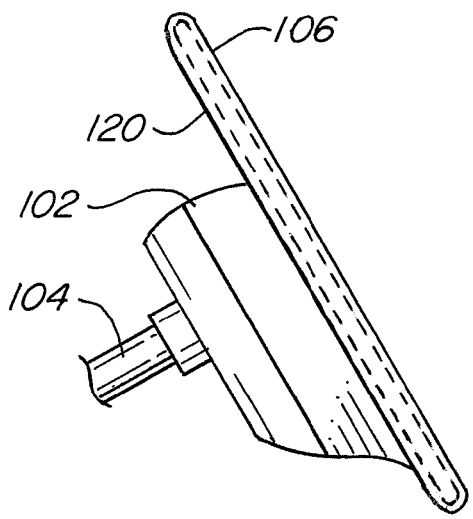
FIG. 4 is a side view of the bladder of FIG. 3 in an undeployed state.

The bladder 106 may have different configurations with respect to how it is attached to the perimeter (periphery) of the handgrip 120. As shown in FIG. 4, the bladder 106 can be disposed partially around the perimeter of the handgrip 120. However, in other embodiments, the bladder 106 can be disposed substantially or completely around the handgrip periphery. Once the bladder 106 is disposed on the handgrip 120, it maintains a tubular profile.

The bladder 106 is also adapted with fasteners for releasably securing the bladder 106 to the handgrip 120. The fasteners may be hook-and-loop VELCRO® fasteners disposed on opposing edges of the bladder. The fasteners may also comprise an adhesive layer distributed along the inner surface of the bladder 106 which contacts the outer surface of the handgrip 120. In another example, the fasteners can be elastic cords incorporated into the edges of the bladder 106 to cause the bladder to encircle and follow the cross-sectional shape of the handgrip 120. Once the bladder 106 is secured to the handgrip 120, the fasteners prevent separation between these components and cause the bladder 106 to remain stationary with respect to the handgrip 120. Accordingly, the bladder 106 does not slip or move relative to the handgrip 120 and does not interfere with the driver's ability to turn or control the steering wheel 102. The bladder 106, in a deflated state (FIGS. 3-4; also shown as 106a in FIG. 6), appears as a thin layer around the handgrip 120. Further, the bladder 106 conforms to the shape and the contours (e.g., finger grooves) of the steering wheel handgrip 120. As such, the bladder 106 is completely flush with the outer surface of the handgrip 120.

Figure 5A:
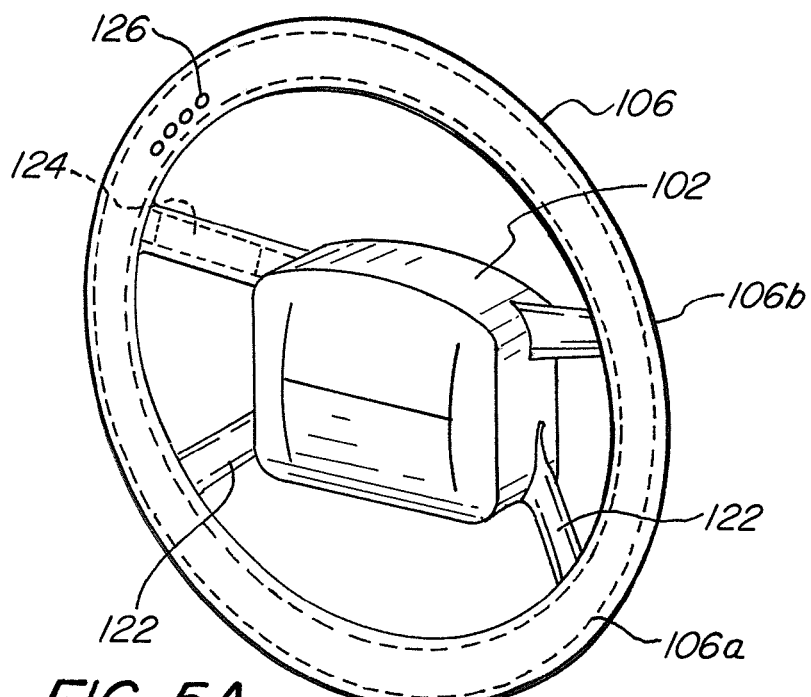
FIG. 5A is a perspective view of the bladder of FIG. 3 in a partially inflated state.
Figure 5B:
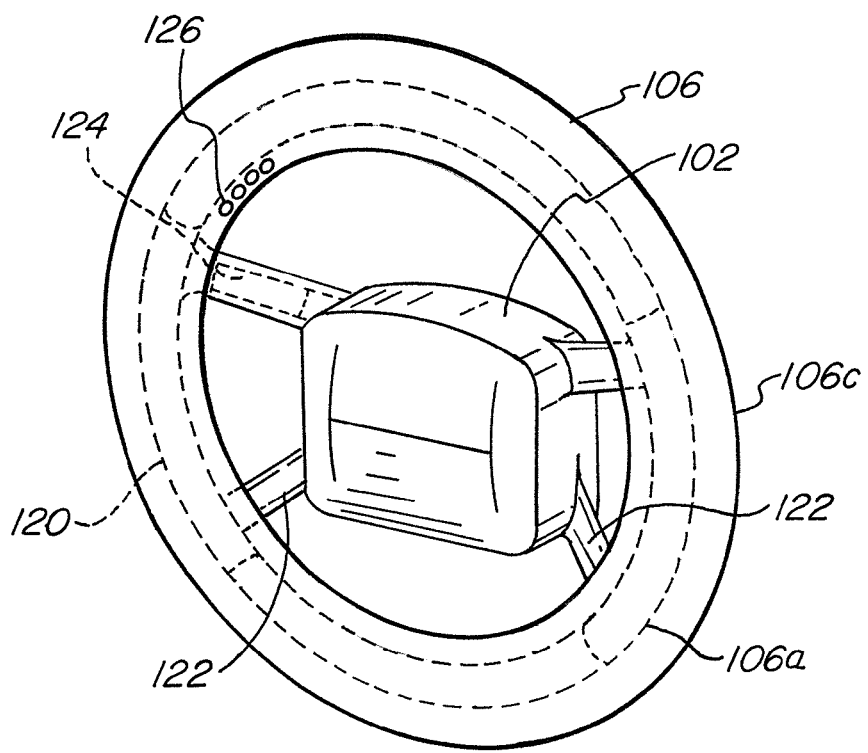
FIG. 5B is a perspective view of the bladder of FIG. 3 in a deployed state.
Figure 6:
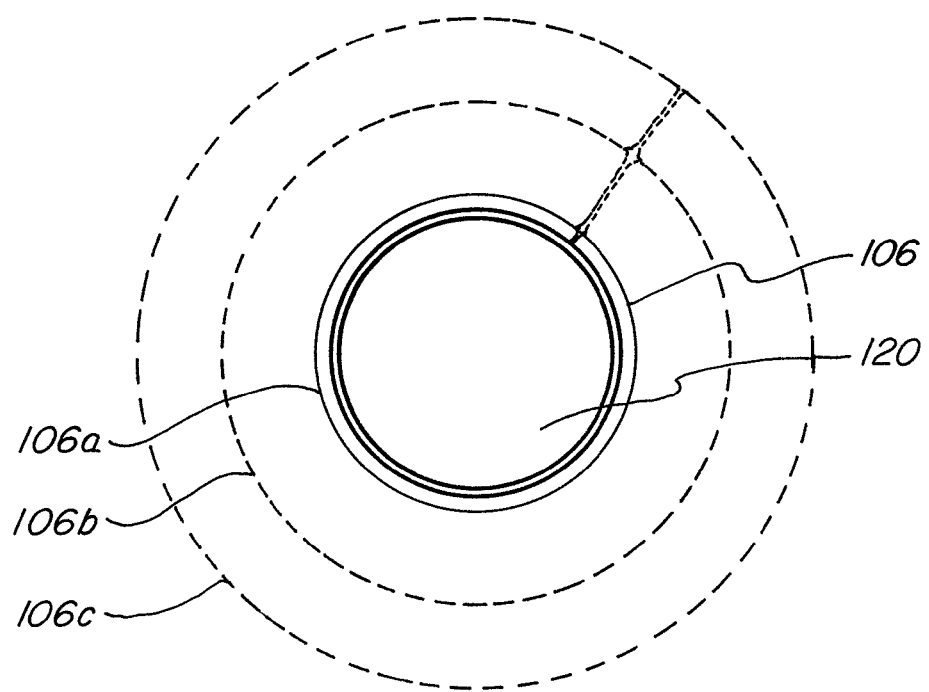
FIG. 6 is a cross-section view of the bladder of FIG. 3, detachably mounted to the surface of a steering wheel handgrip, taken along the line IA-IA.

When the bladder 106 is inflated, it expands outward away from the handgrip 120. FIG. 5A shows the bladder 106 partially inflated to dampen the steering wheel vibrations generated during normal operation of the vehicle (details regarding general vibration damping discussed further below). FIG. 5B shows the bladder 106 in a deployed or substantially full inflation state to cushion and provide protection to the upper extremities during a collision. A cross-section of the handgrip 120 with the bladder 106 at various stages of inflation is illustrated in FIG. 6. Element 106b in this figure demonstrates the bladder 106 being partially inflated, whereas element 106c demonstrates the bladder 106 being fully inflated.

The bladder 106 also comprises one or more illumination markers 126 embedded on the surface of the bladder 106. The illumination markers 126 indicate the status of the steering wheel safety system 100 (e.g., active, inactive, sleep mode), as well as the current driving condition of the vehicle (e.g., vehicle being driven under conditions where there is a potential for a low-impact collision, vehicle being driven under conditions where there is a potential for a high-impact collision). The illumination markers 126 also provide a reminder to the driver to look forward and backward when initially accelerating the vehicle from a braked position (i.e., a situation where if a collision were to occur, it would likely be a low-impact collision). The markers 126 can further be adapted to provide other indications regarding the health and maintenance of the steering wheel safety system 100, such as when the inflatable bladder 106 is nearing the end of its usable life and should be replaced.

Figure 7:
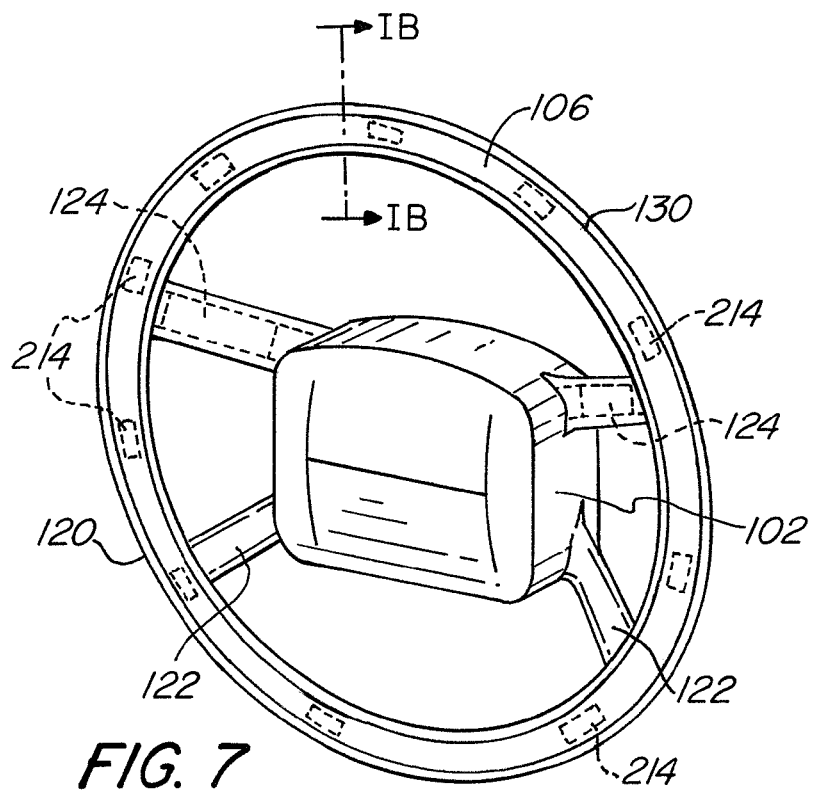
FIG. 7 is a perspective view of one embodiment of the bladder of the adjustable grip steering wheel safety system of FIG. 1, releasably mounted within the steering wheel handgrip, in an undeployed state.
Figure 8:
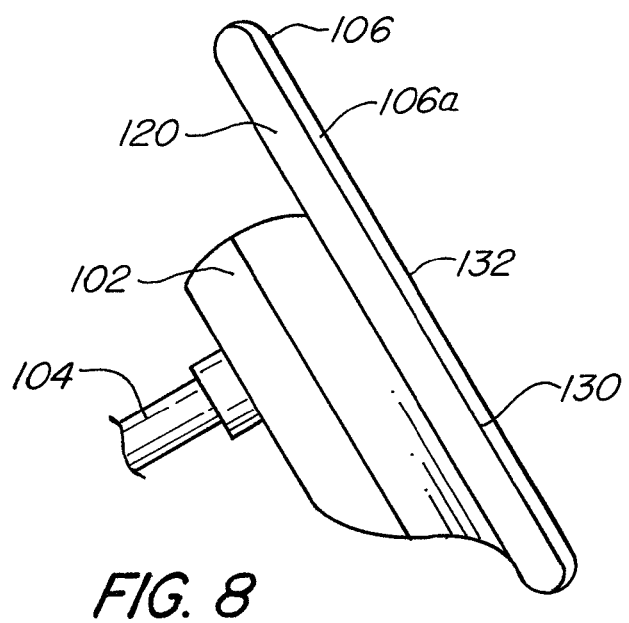
FIG. 8 is a side view of the bladder of FIG. 7 in an undeployed state.
Figure 9:
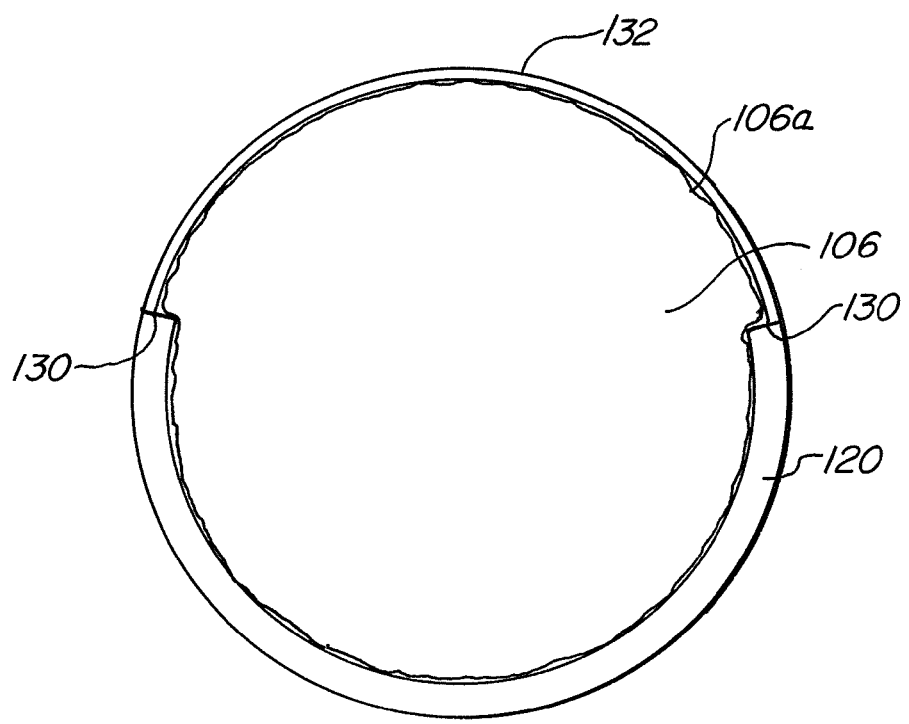
FIG. 9 is a cross-section view of the bladder of FIG. 7, taken along the line IB-IB, in an undepoyed state.

FIGS. 7-11B show another embodiment of the bladder 106. Here, the bladder 106 is mounted and housed within the handgrip 120 of the steering wheel 102. With the bladder 106 disposed within the handgrip 120, it is able to attenuate vibrations and pressure transmitted through the steering wheel 102. The handgrip 120 is further adapted with at least one aperture 130, which provides an opening through which the bladder 106 can expand (or contract) upon being inflated (or deflated) by the inflation device 124. The aperture 130 is configured to extend at least a portion of the circumference of the handgrip 120. As shown in FIG. 7, the aperture 130 may extend the entire circumference of the handgrip 120. In other embodiments, the handgrip 120 may be adapted with a plurality of apertures 130 disposed along its circumference, which allows for the inflatable device to expand out of the handgrip 120 at very points of the steering wheel 102. Further, the aperture 130 is configured to extend a portion of the perimeter of the handgrip 120 (FIG. 8). Accordingly, the aperture 130 may encompass between 20% and 80% of the handgrip's periphery. FIG. 9, in particular, shows one example where the aperture 130 makes up 40% of the periphery of the handgrip 120.

In some embodiments, the aperture 130 is positioned in the handgrip 120 at a location which substantially aligns with a position of the driver's palms when gripping the steering wheel 102. This configuration provides for the bladder 106 to expand towards (or contract from) the palms. As a result, the cushion effect and protection provided by inflation of the bladder 106 can be focused at the driver's palms. In other embodiments, the aperture 130 is positioned in the handgrip 120 at a location which aligns with the fingers when the driver is gripping the steering wheel 102. This configuration of the aperture 130 provides for the bladder 106 to expand towards (or contract away) from the fingers, and therefore, focuses the cushion effect and protection at the fingers.

Still referring to FIGS. 7-11B, the bladder 106 is releasably disposed within the handgrip 120 by inserting the bladder 106 through the aperture 130 into the interior of the handgrip 120. The contact between the bladder 106 and the inner surface of the handgrip 120 produces friction sufficient to maintain the bladder 106 in a stationary position relative to the interior of the handgrip 120. However, the bladder 106 having a grip layer (previously discussed) may also comprise fasteners to releasably secure the bladder 106 to the inner surface of the handgrip 120. One example of the fasteners is an adhesive disposed on the surface of the bladder 106 which contacts the inner surface of the handgrip 120. The fasteners prevent the bladder 106 from shifting within and separating from the handgrip 120 during inflation and deflation.

Figure 10A:
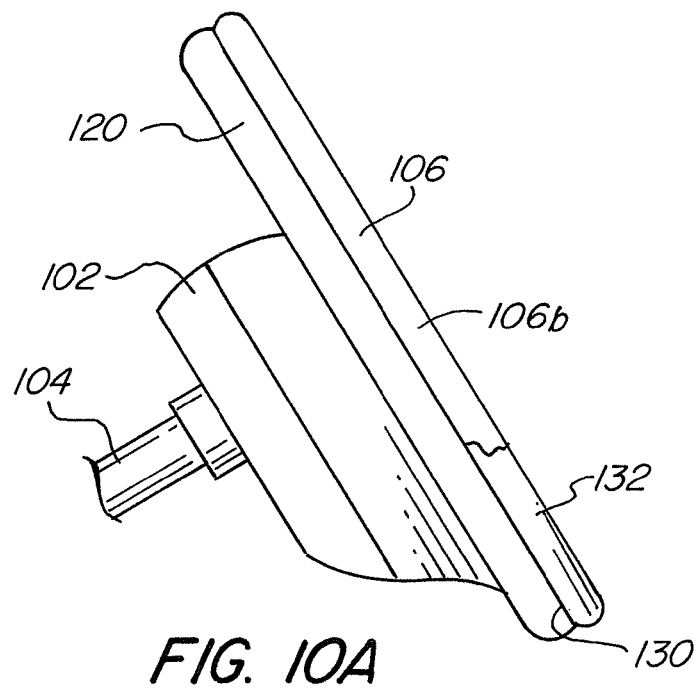
FIG. 10A is a side view of the bladder of FIG. 7 in a partially inflated state.
Figure 10B:
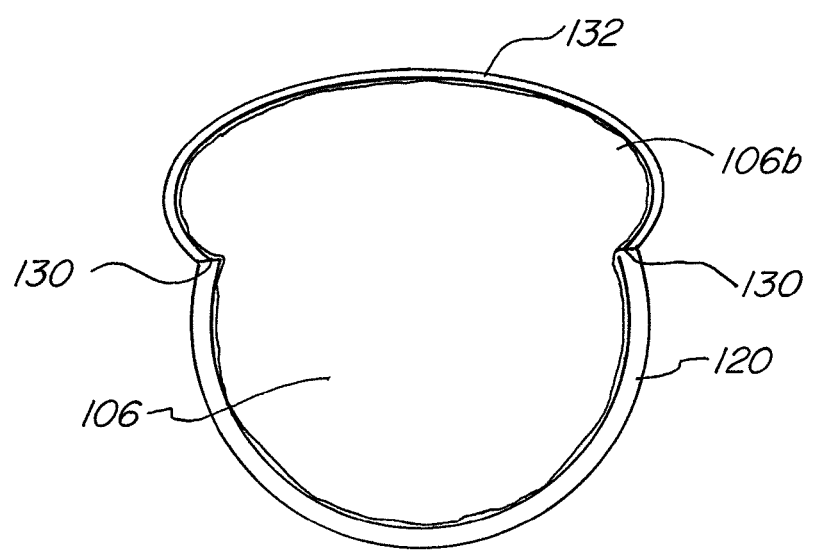
FIG. 10B is a cross-section view of the bladder of FIG. 7, taken along line IB-IB, in a partially inflated state.
Figure 11A:
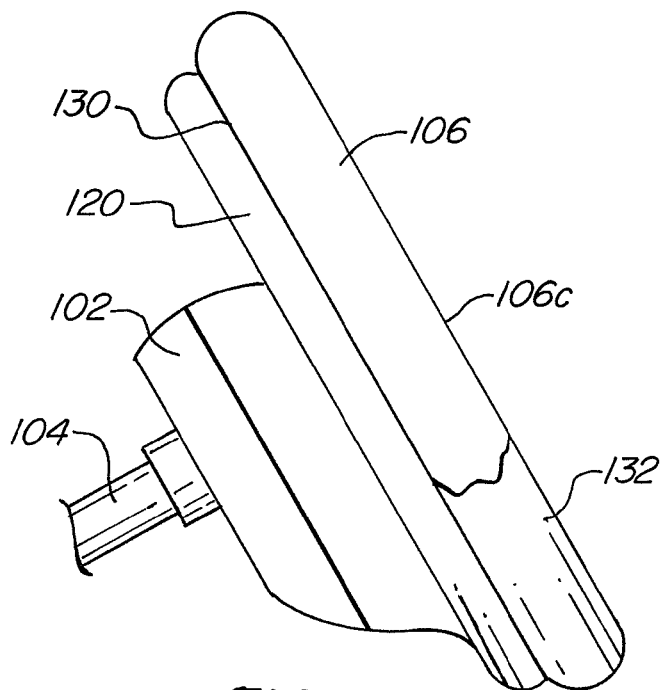
FIG. 11A is a side view of the bladder of FIG. 7 in a deployed state.
Figure 11B:
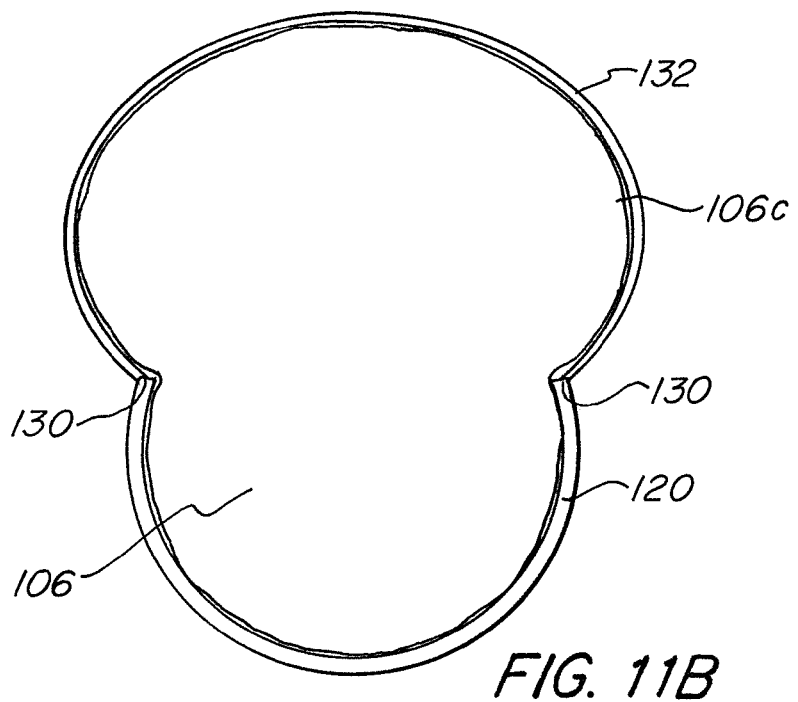
FIG. 11B is a cross-section view of the bladder of FIG. 7, taken along line IB-IB, in a deployed state.

An encasing layer 132 is further provided at the aperture 130. As shown in FIGS. 9, 10B and 11B, the encasing layer 132 has an arc-shaped cross section covering the aperture 130, and thus, completes the cross-sectional profile (i.e. perimeter) of the handgrip 120. The encasing layer 132 is adapted to expand and contract with the bladder 106 (FIGS. 10B and 11B). However, the encasing layer 132 provides a more firm feel than the bladder 106, and thereby provides structural characteristics more consistent with the handgrip 120. As a result, the bladder 106 with the encasing layer 132 (in undeployed state) provides a substantially uniform surface and uniform feel with the outer surface of the handgrip 120. When the controller 108 causes the inflation device 124 to inflate the bladder 106 (partial inflation shown in FIG. 10B; deployment, i.e. substantially full inflation, shown in FIG. 11B), the bladder 106 and the encasing layer 132 expand out from the aperture 130. When the bladder 106 is deflated, the bladder 106 automatically re-positions itself within the handgrip 120 with the encasing layer 132 disposed at the aperture 130. In some embodiments, the encasing layer 132 may be formed on the bladder 106 while in other embodiments, the encasing layer 132 is formed separately from the bladder 106.

As previously noted, the aperture 130 can encompass between 20% and 80% of the perimeter of the handgrip 120. Accordingly, the bladder 106 with the encasing layer 132 can serve anywhere between 20% and 80% of the perimeter to complete the cross-sectional profile of the handgrip 120. As currently shown in FIG. 9, the bladder 106 with the encasing layer 132 makes up 40% of the periphery of the handgrip 120.

The next key component of the steering wheel safety device 100 is the controller 108. The controller 108 monitors the operational status and condition/environment of the vehicle (e.g., velocity, acceleration/deceleration, vehicle orientation, direction of movement, brake pressure, wheel speed). Based on the status and vehicle condition data, the controller 108 is adapted to detect whether there is a collision and decide whether to deploy the bladder 106, thereby rapidly filling it with a specified volume of fluid sufficient to protect the driver's upper extremities. In one embodiment, the controller 108 comprises an electronic control unit. Using various sensors 200 distributed throughout the vehicle (FIGS. 1, 2 and 12), the controller 108 identifies when a collision has occurred. It further determines the type of collision, i.e., low-impact collision, high-impact collision, as well as the characteristics of the collision, including the area of impact, direction of impact, force of impact and severity. When a collision has been detected, the controller 108 uses the vehicle condition data to calculate an inflation rate and volume of fluid with which inflation of the bladder 106 should be performed to provide sufficient protection to the upper extremities. For example, the greater the force of impact, the larger the fluid volume and inflation rate will be calculated to provide increased cushion and impact pressure damping protection.

In one embodiment, the safety system 100 may be programmed to function under opposite conditions from the vehicle's standard airbag system. Specifically, while the standard airbag system is active during high-impact collisions, the adjustable grip steering wheel safety system 100, and thus the controller 108, is configured to be active only during low-impact collisions. With this setup, the controller 108 provides for a smooth transition between the activation-deactivation of the safety system 100 and the deactivation-activation of the standard airbag system. As a result, there is no time delay between the activation of one system and the deactivation of the other, and at least one system is always active. In view of the above, if the vehicle is involved in a high-impact collision, one in which a conventional steering wheel airbag system would be deployed, the controller 108 would not transmit a "trigger" signal to the at least one inflation device 124 to rapidly inflate the bladder 106. If instead a low-impact collision occurs, the controller 108 would be in an active state and transmit the "trigger" signal to the at least one inflation device 124 while the standard airbag system remains in an inactive state. In another embodiment, the controller 108 may be programmed such that the safety system 100 functions under the same conditions as the vehicle's standard airbag system. Here, the safety system 100 deploys during high-impact collisions to provide increased protection to the driver's entire upper body, including the head, chest and upper extremities. In a further embodiment, the controller 108 may be programmed such that the safety system 100 functions during both low-impact and high-impact collisions. The controller 108, in this particular embodiment, would cause the bladder 106 to be rapidly inflated if the vehicle experiences either type of collision.

Based on U.S. regulations, standard airbags are designed to only deploy in high-impact collisions, which are comparable to hitting a solid barrier at or greater than 14 mph. A 14 mph barrier collision is equivalent to striking a parked car of similar size across the full front of each vehicle at about 28 mph. Collisions at speeds of 30 mph or greater as well as head-on collisions at 25 mph or greater also constitute high-impact collisions. Accordingly, at the very least, a low-impact collision would be comparable to hitting a solid barrier between 0-14 mph. The controller 108 continuously determines, based on various vehicle condition parameters (e.g., acceleration/deceleration, velocity/speed, damage, force of impact) whether the vehicle experiences normal driving operation, a low-impact collision, or a high-impact collision. Depending on the programming of the controller 108, it can immediately signal the inflation device 124 to rapidly inflate and expand the bladder 106 during a low-impact collision only, high-impact collision only, or either a low or high-impact collision.

Figure 2:
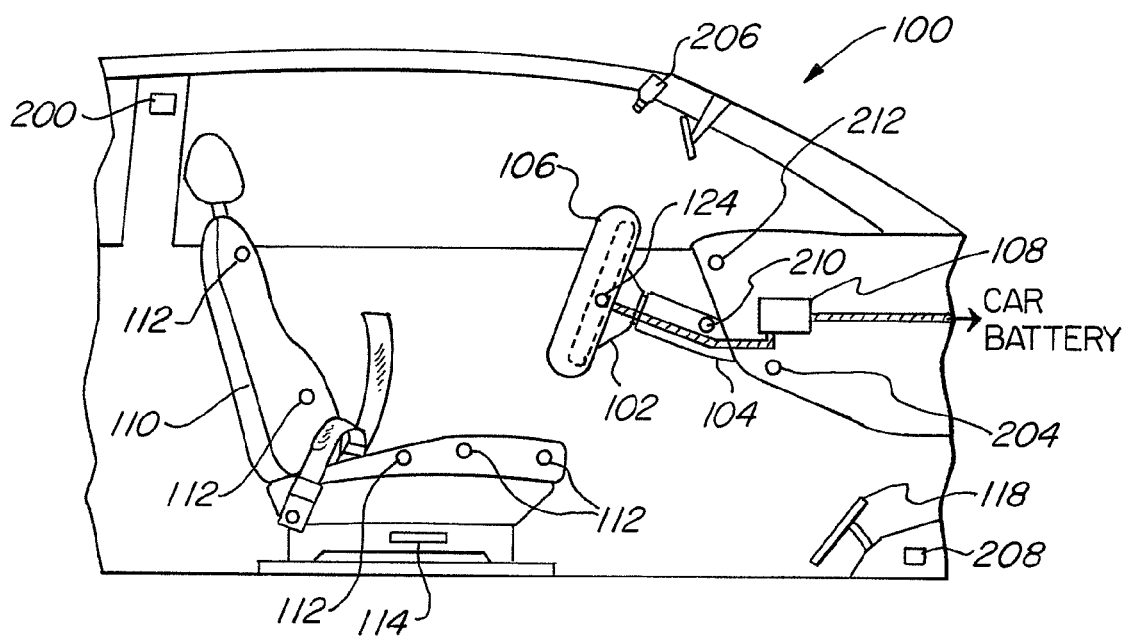
FIG. 2 is a schematic view of the adjustable grip steering wheel safety system of FIG. 1 in a deployed (inflated) state.

In some embodiments of the safety system 100, the controller 108 includes an ignition sensor 212, which detects whether the vehicle ignition system is on or off (FIGS. 1-2). If the ignition system is off, the controller 108 is inactive and will not deploy the bladder 106. Conversely, if the ignition system is on, the controller 108 is active and will deploy the bladder 106 if a collision is detected. In other embodiments, the safety system 100 can be configured in a sleep mode and still be deployable even if the vehicle's ignition system is off. As such, even if the vehicle has not been started, the controller 108 can monitor vehicle conditions and detect whether a collision occurs, such as the case where another car hits the vehicle when it is parked).

The controller 108 may also have an on/off switch. Using the on/off switch, the driver has the ability to manually turn on or off the adjustable grip steering wheel safety system 100.

Communication between the controller 108 and the inflation device 124 can be achieved through an electrical cable. In other embodiments, the controller 108 and the inflation device 124 have transmitter-receiver units, which provide for wireless communication therebetween. For example, the controller 108 and the inflation device 124 may communicate with each other using radio frequency communication, infrared short-range communication, or Bluetooth.

The inflation device 124, as shown in FIGS. 3 and 7, is disposed within one of the spokes 122 of the steering wheel 102. The inflation device 124 has a small profile such that it can be fitted entirely within the spoke 122. In some embodiments where the steering wheel safety system 100 comprises more than one inflation device 124, the devices may be disposed within one single spoke 122 or may be distributed between the multiple spokes of the steering wheel 102.

Figure 13:
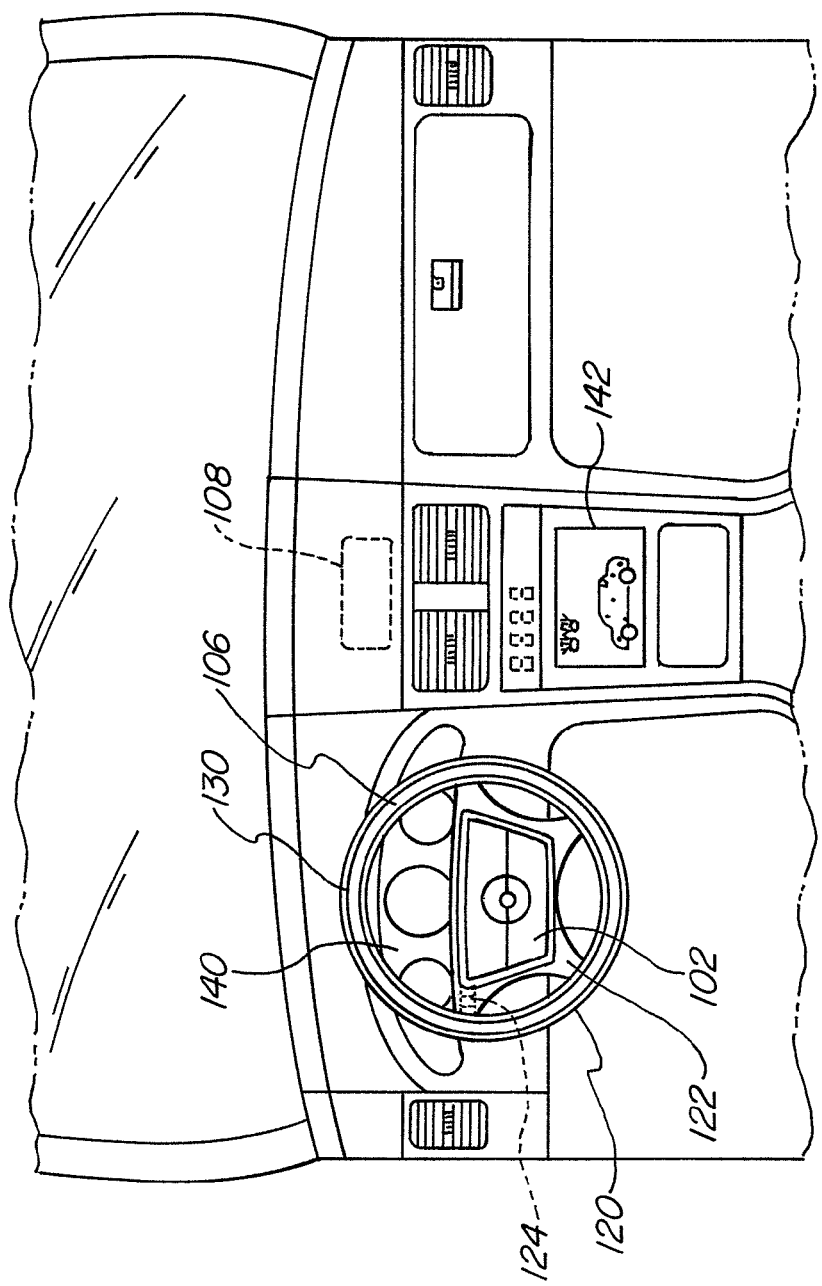
FIG. 13 is a schematic view of the front dashboard of a vehicle equipped with the adjustable grip steering wheel safety system of FIG. 1.

Upon receiving the "trigger" signal from the controller 108, the inflation device 124 injects fluid into the bladder 106. In some embodiments, the fluid used to expand the bladder 106 is a gas. For example, air can be used to inflate the bladder 106. The fluid can be a nitrogen gas or a mixture of different gases, either pressurized or non-pressurized. In other embodiments, the fluid is a liquid. For example, water can be used to expand the bladder 106. In further embodiments, the fluid is a gel, composite, or silicone-based fluid material. A storage tank preferably disposed in or near the steering column 104 contains the fluid used in the inflation process. Alternatively, the storage tank can be located in other areas of the vehicle, such as under the hood. With a feeding tube connecting the storage tank to the inflation device 124, fluid is passed to and from the inflation device 124. A fluid level sensor can be integrated into the storage tank in order to provide fluid level information to the controller 108. If the controller 108 detects a low level of inflation fluid, it provides a warning to the driver via the illumination markers 126, an indicator light on the vehicle's instrument panel 140, and/or a status display on the vehicle's GPS system monitor 142 (FIG. 13).

The inflation device 124 has an aspiration valve that is coupled to at least one inlet disposed in the bladder 106. The connection between the aspiration valve and the inlet is sealed and air-tight. In some embodiments, the aspiration value is connected directly to the inlet of the bladder 106. In other embodiments, a tube is used to provide a fluid channel between the aspiration valve and the inlet. The aspiration valve regulates the directional flow of the fluid based on commands sent by the controller 108. During inflation, the inflation device 124 is controlled to allow fluid to flow into the bladder 106. However, during deflation, the inflation device 124 directs fluid to flow from the bladder 106 to the storage tank. In some embodiments, the inflation device 124 may be adapted with a separate discharge valve in fluid communication with the bladder 106 for communicating fluid out of the bladder 106. As previously mentioned, the bladder 106 may comprise multiple inflatable compartments. Where the inflatable compartments are isolated and independent of each other, each compartment has an inlet that is in fluid communication with the inflation device 124.

The inflation device 124 is adapted to efficiently aspirate fluid from the storage tank into the bladder 106. The inflation device 124 is capable of having varying pumping characteristics. More specifically, the rate of inflation and the fluid volume with which that the inflation device 124 expands the bladder 106 can vary depending on the characteristics of the collision. The controller 108 will calculate the volume of fluid and the inflation rate such that sufficient protection is provided to the upper extremities. Other factors may also affect the pumping characteristics of the inflation device 124, such as the position of the driver in the driver seat and the position of the driver's upper extremities with respect to the steering wheel 102. Specifically, the system may take into account the position of the driver's body in the seat 110 so as not to inflate (deploy) if positioning will cause damage to bodily structures other than the upper extremities. For example, if the driver is holding the steering wheel with his upper extremities flexed such that his head, neck and chest are close to the steering wheel 102, the controller 108 will recognize such positioning and prevent deployment of the bladder 106 so as not to cause other injuries to the driver. In other instances, the controller 108 may decrease the inflation rate of the inflation device 124 in order to reduce the likelihood that the bladder 106 impacts the driver's head and chest during deployment and causes inadvertent injuries thereto.

Figure 12:
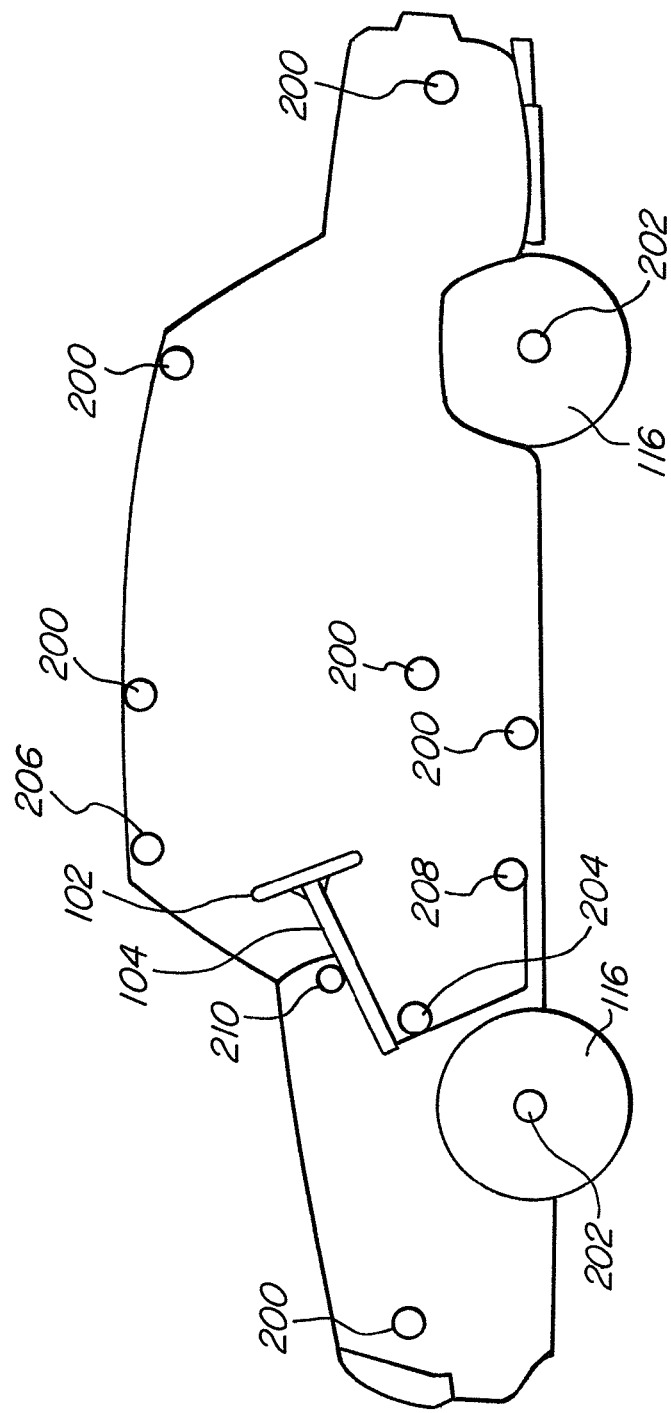
FIG. 12 is a schematic view of sensors of the adjustable grip steering wheel safety system of FIG. 1 distributed on the vehicle.

The controller 108 performs the above adjustments to the inflation device 124 as well as determines the characteristics of a vehicle collision by receiving and analyzing vehicle condition data, such as the vehicle's acceleration/deceleration and velocity, force of impact and damage exerted on the vehicle during the collision. In one embodiment, the controller 108 may be equipped with internal sensors which monitor and measure the above vehicle condition data. For example, the controller 108 can have a GPS unit providing constant vehicle location data. Using this location data, the controller 108 can calculate the acceleration/deceleration and velocity of the vehicle. In another embodiment, the controller 108 receives the vehicle data from the standard instrumentation provided in the vehicle, such as the speedometer and acceleration gauge. In other embodiments, the adjustable grip steering wheel safety system 100 is equipped with sensors 200 that are distributed throughout the vehicle, as shown in FIG. 12. Preferably, some of the sensors 200 are located at or near the front end and rear end of the vehicle. For example, sensors 200 can be installed in the front and rear bumpers. Further, some of the sensors 200 are situated on the sides of the vehicle, including the front and/or rear doors. In order to provide a more comprehensive field of measurement, additional sensors 200 are disposed along the roof of the vehicle, which are helpful in determining the height of impact relative to the vehicle. Each of the sensors 200 can have a microelectromechanical system (MEMS) architecture. Each sensor 200 further comprises one or more measuring devices, such as accelerometers, impact sensors, side pressure sensors, and gyroscopes. In addition, the steering wheel safety system 100 may be adapted to utilize and exploit the vehicle's standard airbag system. More specifically, the controller 108 may communicate with and receive data from the crash sensors of a standard airbag system. This implementation of the adjustable grip steering wheel safety system 100 is beneficial because it reduces the number of additional sensors 200 disposed in the vehicle.

The controller 108 may communicate with a brake pressure sensor 208 disposed at the brake pedal 118, as shown in FIGS. 1, 2 and 12. The brake pressure sensor 208 measures the pressure in the vehicle's braking system and the braking force applied to the vehicle. The controller 108 uses this braking force data to adjust the manner in which the bladder 106 expands (e.g., rate of inflation, volume of fluid).

Wheel speed sensors 202 may be incorporated into the steering wheel safety system 100. The wheel speed sensors 202 are disposed in one or more of the vehicle's wheels 116 (FIG. 12). The wheel speed sensors 202 provide an accurate measurement of the rotation of the vehicle's wheels, accounting for variations in road condition (e.g., gravel road, dirt road, pavement, wet road). This information is utilized by the controller 108 to calculate an improved measure of the vehicle's speed and acceleration/deceleration, and in turn, adjust the manner in which the bladder 106 deploys.

The safety system 100 may also comprise occupant seat sensors 112 and a seat position sensor 114 disposed on the driver seat 110, (FIGS. 1-2). More specifically, the occupant seat sensors 112 are distributed within a backrest and seat bottom of the driver seat 110. The occupant seat sensors 112 first detect whether a person is sitting in the driver seat 110. By measuring a load on the driver seat 110 (i.e., driver's weight), the occupant seat sensors 112 recognize that the driver seat 110 is occupied. An "occupied" signal is transmitted from the seat sensors 112 to the controller 108, notifying the controller 108 whether it should be in an active mode or inactive mode. In other words, if there is no driver in the driver seat 110, the controller 108 will not initiate rapid inflation of the bladder 106 if a collision occurs. However, if the occupant seat sensors 112 alert the controller 108 of the driver's presence, then the controller 108 is in active mode and will deploy the bladder 106 if a collision occurs.

The occupant seat sensors 112 further monitor the position of the driver and adjusts the expansion of the bladder 106 according the driver's position. For example, if the driver is close to the steering wheel 102, the bladder 106 may be inflated at a lower rate than if the driver was seated properly. This helps to minimize the chances that rapid deployment of the bladder 106 will inadvertently injure other body parts of the driver (e.g., head, chest).

The occupant seat sensors 112 can also measure an angle of the backrest of the driver seat 110 as well as a tilt angle of the seat bottom. This seat information is relevant to determining how vibrations and pressure are transmitted to the driver's upper extremities during a collision. Accordingly, the controller 108 uses the seat information to adjust deployment of the bladder 106 during a collision.

The seat position sensor 114 disposed on the base of the driver seat 110 measures the position of the driver seat 110 relative to the steering wheel 102. This information is communicated to the controller 108 to adjust how the inflation device 124 inflates the bladder 106. When the driver seat 110 is configured close to the steering wheel 102, the controller 108 can determine that the distance between the steering wheel 102 and the driver's arms, elbows and shoulders is relatively small. As a result, the controller 108 will adjust the fluid volume and inflation rate of the inflation device 124 accordingly to provide sufficient protection for the driver's upper extremities during a collision. On the other hand, if the driver seat 110 is configured further away from the steering wheel 102, the controller 108 can determine that the distance between the steering wheel 102 and the driver's arms, elbows, and shoulders is relatively large. As such, the controller 108 will adjust the fluid volume and rate of inflation of the inflation device 124 accordingly to provide sufficient protection given this scenario.

In addition to the seat position sensor 114, the safety system 100 may include a camera sensor 206 which faces towards the driver seat 110, as shown in FIGS. 1-2. Like the occupant seat sensors 112, the camera sensor 206 is capable of detecting the presence of a driver in the driver seat 110. More importantly, the camera sensor 206 is used to detect the position and arrangement of the driver's upper extremities which respect to the steering wheel 102. For example, the camera sensor 206 can detect if the left hand, right hand, or both hands of the driver are on the steering wheel 102. If only one of the driver's hands is gripping the steering wheel when a collision occurs, the controller 108 can adjust the deployment of the bladder 106 so that inflation is focused towards the area of the bladder 106 where the one hand is gripping. This helps ensure that optimal protection is provided to the hand gripping the steering wheel 102. The camera sensor 206 also detects the arrangement of the driver's upper extremities. Specifically, the camera sensor 206 can determine how and by how much the driver's arms are bent when he holds onto the steering wheel 102. The upper extremity arrangement data can be utilized by the controller 108 to further adjust the manner in which the bladder 106 is deployed.

A steering wheel position sensor 210 may also be included in the steering wheel safety system 100. As shown in FIGS. 1-2 and 12, the steering wheel position sensor 210 is disposed on the steering column 104. This particular sensor measures the tilt angle of the steering column 104 and steering wheel 102. This information is relevant in determining how pressure from a low-impact collision is transferred to the driver's upper extremities (e.g., vector of impact pressure). Therefore, to provide improved protection to the upper extremities, steering wheel tilt data is communicated to the controller 108 to adjust the inflation of the bladder 106 accordingly.

The safety system 100 may also be adapted with an early-warning safety system feedback which links the controller 108 with one or more grip pressure sensors 214, as shown in FIGS. 3 and 7. The grip pressure sensor 214 is configured to detect a sudden and strong increase in external pressure exerted by the driver's hands on the handgrip 120 and the bladder 106. It is well known that when a driver encounters an unforeseen or unanticipated dangerous situation, such as an event leading up to a collision, the driver's natural reaction is to immediately grip the steering wheel with great force and strength. Generally, the force of the grip and the speed in which the forceful grip is exerted on the steering wheel correlate to the degree of anxiety and panic the driver experiences. Therefore, the greater the danger, the more likely the driver will experience extreme panic and thus will rapidly (and suddenly) grip the steering wheel with greater force and pressure then he or she previously exerted on the steering wheel. The driver may also react in a sudden dangerous situation by locking his or her elbows and exerting great force through the palms on the portion of the steering wheel oriented towards the driver. In some situations, the driver may instead quickly release the steering wheel and cover his or her face when a collision is about to occur. The grip pressure sensor 214 detects these types of sudden changes in external pressure (e.g., forceful grip pressure, absence of grip pressure) and measures the rate of change and pressure magnitude thereof. If the external pressure exerted on the handgrip 120 and/or bladder 106 changes or deviates beyond a rate and magnitude threshold, the sensor 214 alerts the controller 108 of an impending vehicle collision. Upon receiving an alert signal from the grip pressure sensor 214, the controller 108 initiates the deployment of bladder 106. In some embodiments, to provide a more robust and accurate system, the controller 108 may record a time history of the grip pressure exerted by the driver's hands on the handgrip 120 and bladder 106 to determine whether to deploy the bladder 106. The controller 108 can also adjust the fluid volume and inflation rate of the inflation device 124 when deploying the bladder 106 based on the measured rate of change and force/pressure magnitude of the driver's grip. The sensor 214 is further designed to differentiate between the sudden, forceful grip caused when the driver panics and the typical increase in pressure caused by the driver initially gripping the steering wheel during normal driving conditions. In some embodiments, the grip pressure sensor 214 comprises a pressure sensor. In other embodiments, the sensor 214 comprises a piezoelectric sensor.

With regard to the grip pressure sensor 214, the safety system 100 may comprise one or a plurality of these sensors disposed around the steering wheel 102. In some embodiments, the grip pressure sensors 214 may be disposed on the bladder 106 and more specifically embedded in the surface of the bladder 106. In other embodiments, the grip pressure sensors 214 may be disposed on the handgrip 120 of the steering wheel 102. Further still, multiple grip pressure sensors 214 may be distributed in both the bladder 106 and the handgrip 120. In the scenario where a single grip pressure sensor 214 is used, the sensor 214 may be adapted to extend substantially the entire length of the bladder 106 and/or the handgrip 120.

Each of the above discussed sensors (i.e., sensors 200, brake pressure sensor 208, wheel speed sensor 202, occupant seat sensors 112, seat position sensor 114, camera sensor 206, steering wheel position sensor 210, ignition sensor 212, grip pressure sensor 214) can communicate with the controller 108 through signal cables connected therebetween. Alternatively, the sensors and controller 108 may have transmitter-receiver units to provide wireless communication therebetween. Examples of the wireless communication between the sensors and the controller 108 are radio frequency communications, infrared short-range communication, and Bluetooth.

The bladder 106 of the steering wheel safety system 100 is also adapted to provide an adjustable grip to the steering wheel handgrip 120 during normal driving conditions, regardless if the controller is in active or inactive mode for collision protection. Specifically, the bladder 106 can be partially inflated by the inflation device 124 to provide varying levels of grip firmness, as shown in FIGS. 5A and 10A-10B. By having the bladder 106 partially inflated, the typical vibrations and pressure transferred through the steering column 104 and steering wheel 102 to the driver's upper extremities can be dampened. In one embodiment, the adjustable grip steering wheel safety system 100 can include a vibration sensor 204 disposed on or near the steering column 104, wherein the vibration sensor 204 measures the amplitude and frequency of the vibrations in the steering column 104. By using this vibration data, the controller 108 can adjust in real-time the damping level (i.e., amount of partial inflation) of the bladder 106 to provide a sufficient damping of the steering wheel vibrations during normal driving operation. Moreover, the bladder 106 may be adapted with pressure sensors to measure the pressure exerted on the bladder 106 by the driver's hands, i.e., how tight the driver is grasping the bladder 106. In some embodiments, the pressure sensors comprise the grip pressure sensors 214 discussed previously. The pressure information measured by the pressure sensors is communicated to the controller 108 to further adjust the damping level of the bladder 106. In some embodiments, the safety system 100 includes a switch mechanism disposed on the handgrip 120 or spoke 122 of the steering wheel 102, which provides the driver with the ability to customize the grip firmness and vibration damping qualities to his individual preference. The switch mechanism communicates through wired or wireless means with the controller 108 to control the inflation device 124 to either inflate or deflate the bladder 106. For example, the switch mechanism can comprise two push button switches, one for increasing inflation and the other for decreasing inflation. In another example, the switch mechanism can comprise a turn knob, wherein rotation in one direction inflates in the bladder 106 and rotation in the opposite direction deflates the bladder 106. Other types of switches and buttons, including piezoelectric sensor-based switches, may be used as the switch mechanism for manually adjusting grip firmness and damping level.

While the steering wheel safety system 100 provides an adjustable grip through partial inflation of the bladder 106 during normal operation of the vehicle, the system still provides sufficient protection to the upper extremities during a vehicle collision. Specifically, when a collision is detected, the controller 108 causes the inflation device 124 to rapidly inflate the bladder 106 with additional volume of fluid above the volume of fluid already present in the bladder 106. The controller 108 calculates the amount of additional volume to use in expanding the bladder 106 using the vehicle condition data measured by the various sensors included in the steering wheel safety system 100. Further, the controller 108 may take into account the initial fluid volume present in the bladder 106 (partial inflation) immediately before the collision to determine the additional volume of fluid needed to provide sufficient protection to the upper extremities. In order for the controller 108 to have access to such information, the bladder 106 may be adapted with at least one fluid pressure sensor disposed therein.

The adjustable grip steering wheel safety system 100 according to the present invention also provides a warning indication alerting the driver that the system safety 100 is in active mode as the driver is operating the vehicle. The warning indication further alerts the driver to look at the front and back of the car when in a low-impact situation when starting to accelerate the vehicle. In one embodiment, the warning indication comprises a warning light on the vehicle's instrument display (dashboard) 140, as shown in FIG. 13. In another embodiment, the warning indication comprises a warning symbol displayed through the vehicle's GSP/backup view monitor 142. In yet another embodiment, the warning indication comprises a warning tone or beeping sound produced by the vehicle's sound system. In still another embodiment, the warning indication comprises the illumination markers 126 embedded in the bladder 106, as shown in FIG. 3.

Although the invention has been described with reference to particular arrangement of parts, features, and the like, these are not intended to exhaust all possible arrangement or features, and indeed many modifications and variations will be ascertainable to those of skill in the art.

What is claimed is:

1. A safety system for protecting the upper extremities of a driver, the safety system comprising:
   a bladder disposed on or in a handgrip of a steering wheel of a vehicle;
   at least one inflation device in fluid communication with the bladder;
   a controller adapted to detect a collision involving the vehicle and cause the inflation device to inflate the bladder with a fluid when the collision is detected; and
   at least one sensor disposed on the vehicle, said at least one sensor measuring at least one vehicle parameter, wherein said controller uses said vehicle parameter to detect the collision and to calculate a volume of fluid and a rate of inflation with which said inflation device inflates said bladder.

2. The system of claim 1, wherein the bladder is releasably attached to an outer surface of the handgrip.

3. The system of claim 1, wherein the bladder is mounted within the handgrip, said handgrip having at least one aperture for accommodating the bladder, said at least one aperture extending at least partially a circumference of the handgrip.

4. The system of claim 3, wherein the bladder is adapted to expand out of or contract from said handgrip through said at least one aperture when the bladder is respectively inflated or deflated with said fluid.

5. The system of claim 1, wherein the bladder is adapted to expand towards or contract away from fingers of the driver gripping the handgrip.

6. The system of claim 1, wherein the bladder is adapted to expand towards or contract away from palms of the driver gripping the handgrip.

7. The system of claim 1, wherein said at least one sensor comprises at least one pressure sensor positioned on at least one of the handgrip and bladder, said pressure sensor measuring an external pressure exerted on said at least one of the handgrip and bladder, wherein said controller is adapted to detect the collision when at least one of a magnitude and rate by which the external pressure changes is greater than a threshold.

8. The system of claim 1, wherein the at least one sensor comprises at least one crash sensor from an airbag system of the vehicle.

9. The system of claim 1, wherein the controller is adapted to detect the collision by determining the collision is a low-impact collision, the low-impact collision being less than in deceleration to a 14 mph barrier collision.

10. The system of claim 1, wherein the controller is adapted to detect the collision by determining the collision is a high-impact collision, the high-impact collision being at least equivalent in deceleration to a 14 mph barrier collision.

11. The system of claim 1, wherein the at least one inflation device is disposed in a spoke of the steering wheel.

12. The system of claim 1, wherein the bladder has a plurality of inflatable compartments, each compartment having fluid communication with said at least one inflation device, said controller causing said at least one inflation device to provide inflation to each compartment.

13. The system of claim 1, wherein said bladder is adapted to be deflated, arranged back into an initial configuration, and re-inflated in subsequent collisions.

14. A safety system for protecting the upper extremities of a driver, the safety system comprising:
   a bladder disposed on or in a handgrip of a steering wheel of a vehicle;
   at least one inflation device in fluid communication with the bladder; and
   a controller adapted to detect a collision involving the vehicle and cause the inflation device to inflate the bladder with a fluid when the collision is detected;
   wherein the bladder has a plurality of inflatable compartments, each compartment having fluid communication with said at least one inflation device, said controller causing said at least one inflation device to provide inflation to each compartment.

15. The system of claim 14, wherein each compartment is isolated and has independent fluid communication with said at least one inflation device.

16. A safety system for protecting the upper extremities of a driver, the safety system comprising:
   at least one bladder disposed on or in a handgrip of a steering wheel of a vehicle, said steering wheel having at least two spokes connecting said handgrip to a steering hub;
   at least one of inflation device in fluid communication with the bladder;
   at least one sensor disposed on said vehicle, said sensor measuring at least one vehicle parameter; and
   a controller adapted to detect a collision involving the vehicle using said vehicle parameter and cause said inflation device to inflate the bladder with a fluid;
   wherein the bladder is positioned between the spokes, the bladder comprising a plurality of independent inflatable compartments, each compartment having independent fluid communication with the at least one inflation device;
   wherein each of the inflatable compartments is adapted to be inflated with a volume of fluid by said at least one inflation device; and
   wherein the controller determines a position on the bladder where hands of the driver are gripping, and causes said inflation device to inflate the inflatable compartments disposed substantially at the position of the driver's hands before inflating other inflatable compartments.

17. A safety system for protecting the upper extremities of a driver, the safety system comprising:
   at least one bladder disposed on or in a handgrip of a steering wheel of a vehicle, said steering wheel having at least two spokes connecting said handgrip to a steering hub;
   at least one of inflation device in fluid communication with the bladder;
   at least one sensor disposed on said vehicle, said sensor measuring at least one vehicle parameter; and a controller adapted to detect a collision involving the vehicle using said vehicle parameter and cause said inflation device to inflate the bladder with a fluid;

wherein the bladder is positioned between the spokes; and wherein said at least one sensor comprises at least one pressure sensor positioned on at least one of the handgrip and bladder, said pressure sensor measuring an external pressure exerted on said at least one of the handgrip and bladder, wherein said controller is adapted to detect the collision when at least one of a magnitude and rate by which the external pressure changes is greater than a threshold.

18. A safety system for protecting the upper extremities of a driver, the safety system comprising:

a bladder disposed on or in a handgrip of a steering wheel of a vehicle;

at least one inflation device in fluid communication with the bladder; and a controller causing the inflation device to partially inflate the bladder with a volume of fluid sufficient to dampen pressure and vibrations transmitted through the steering wheel during normal operation of the vehicle;

wherein the controller is adapted to detect a collision involving the vehicle and cause the inflation device to rapidly inflate the bladder with an additional volume of fluid sufficient to cushion the upper extremities when the collision is detected.

19. The system of claim 18, wherein the bladder is releasably attached to an outer surface of the handgrip of the steering wheel.

20. The system of claim 18, wherein the bladder is mounted within the handgrip, said handgrip having at least one aperture for accommodating the bladder, said at least one aperture extending at least partially a circumference of the handgrip, and wherein said bladder is adapted to expand out of or contract from said handgrip through said at least one aperture when the bladder is respectively inflated or deflated with said fluid.

21. The system of claim 18, wherein the controller adjusts the volume of fluid in said bladder based on a frequency and amplitude of said vibrations.

22. The system of claim 18, further comprising a control switch connected to the controller, wherein said control switch is adapted to adjust the volume of fluid in said bladder by adjusting the inflation of said bladder.

23. The system of claim 18, further comprising at least one sensor disposed on the vehicle, said sensor measuring at least one vehicle parameter, wherein said controller uses said vehicle parameter to detect the collision.

24. The system of claim 23, wherein said at least one sensor comprises at least one pressure sensor positioned on at least one of the handgrip and bladder, said pressure sensor measuring an external pressure exerted on said at least one of the handgrip and bladder, wherein said controller is adapted to detect the collision when at least one of a magnitude and rate by which the external pressure changes is greater than a threshold.

25. The system of claim 23, wherein the controller uses said vehicle parameter to calculate the additional volume of fluid and a rate of inflation with which said inflation device rapidly inflates said bladder.

26. A safety system for protecting the upper extremities of a driver, the safety system comprising:

at least one bladder disposed on or in a handgrip of a steering wheel of a vehicle, said steering wheel having at least two spokes connecting said handgrip to a steering hub;

at least one of inflation device in fluid communication with the bladder;

at least one sensor disposed on said vehicle, said sensor measuring at least one vehicle parameter; and a controller adapted to detect a collision involving the vehicle using said vehicle parameter and cause said inflation device to inflate the bladder with a fluid;

wherein the bladder is positioned between the spokes the bladder includes plurality of independent inflatable compartments, each compartment having independent fluid communication with the at least one inflation device; and wherein each of the inflatable compartments is adapted to be inflated with a volume of fluid by said at least one inflation device.

27. The system of claim 26, wherein the controller causes said inflation device to inflate each inflatable compartment simultaneously.

28. The system of claim 26, wherein the at least one bladder comprises a plurality of bladders equal in number to the spokes of the steering wheel, each bladder being in independent fluid communication with the at least one inflation device, and wherein one bladder is positioned at each section of the handgrip bordered between two spokes.

29. The system of claim 26, wherein said at least one sensor comprises at least one pressure sensor positioned on at least one of the handgrip and bladder, said pressure sensor measuring an external pressure exerted on said at least one of the handgrip and bladder, wherein said controller is adapted to detect the collision when at least one of a magnitude and rate by which the external pressure changes is greater than a threshold.

30. A safety system for protecting the upper extremities of a driver, the safety system comprising:

a bladder disposed on or in a handgrip of a steering wheel of a vehicle;

at least one inflation device in fluid communication with the bladder;

a controller adapted to detect a collision involving the vehicle and cause the inflation device to inflate the bladder with a fluid when the collision is detected; and at least one sensor disposed on the vehicle, said at least one sensor measuring at least one vehicle parameter, wherein said controller uses said vehicle parameter to detect the collision, said at least one sensor including at least one pressure sensor positioned on at least one of the handgrip or bladder, said at least one pressure sensor measuring an external pressure exerted on said at least one of the handgrip and bladder, wherein said controller is adapted to detect the collision when at least one of a magnitude and rate by which the external pressure changes is greater than a threshold.

* * * * *